(12) United States Patent
Sano et al.

(10) Patent No.: US 7,346,554 B2
(45) Date of Patent: Mar. 18, 2008

(54) ONLINE SHOPPING SYSTEM, INFORMATION PROCESSING APPARATUS AND METHOD, AND INFORMATION PROCESSING PROGRAM RECORDING MEDIUM

(75) Inventors: Kousei Sano, Osaka (JP); Shinichi Tanaka, Kyotanabe (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 753 days.

(21) Appl. No.: 10/425,600

(22) Filed: Apr. 30, 2003

(65) Prior Publication Data
US 2003/0208415 A1 Nov. 6, 2003

(30) Foreign Application Priority Data
May 1, 2002 (JP) ............................... 2002-129719

(51) Int. Cl.
G06Q 30/00 (2006.01)
(52) U.S. Cl. ......................................... 705/26; 177/149
(58) Field of Classification Search .................. 705/26, 705/27; 177/149
See application file for complete search history.

(56) References Cited

U.S. PATENT DOCUMENTS

| | | | | |
|---|---|---|---|---|
| 7,136,830 B1 * | 11/2006 | Kuelbs et al. | ................ | 705/27 |
| 2002/0007618 A1 * | 1/2002 | Armington et al. | ........... | 53/472 |
| 2002/0049667 A1 * | 4/2002 | Navani et al. | ................ | 705/37 |
| 2003/0083890 A1 * | 5/2003 | Duncan et al. | ................ | 705/1 |

FOREIGN PATENT DOCUMENTS

| | | |
|---|---|---|
| JP | 2001-319106 | 11/2001 |
| JP | 02001319106 | * 11/2001 |

OTHER PUBLICATIONS

JP2001-319106-A, English translation of Japanese Patent received in IDS received Apr. 30, 2003, 32 pages, acquired Jul. 31, 2006.*
Harrington, Lisa, "Point and click to any place on earth", Transportation & Distribution, Aug. 2000.*
Chaffee, Alex, One, two, three, or n tiers?; Should you hold back the tiers of your application?; Buzzword watch, Javaworld, Jan. 1, 2000.*

* cited by examiner

Primary Examiner—Mark Fadok
(74) Attorney, Agent, or Firm—Wenderoth, Lind & Ponack, L.L.P.

(57) ABSTRACT

An online shopping system is provided for minimizing transportation costs by using a plurality of prestandardized delivery containers to eliminate waste in product delivery, and enhancing the convenience of users by automatically selecting a delivery container in accordance with the size of a selected product and clearly denoting information about an order closing time, a delivery source location, etc. When the user inputs the type and the quantity of a product, a delivery container which is optimal for storing the ordered product is automatically selected based on the volume of the product and an internal capacity of the delivery container, and a price of the selected delivery container is displayed. Thereafter, each time an additional product is ordered, a new delivery container which is optimal for storing all ordered products including the additional product is selected, and a price of the new delivery container is calculated. Information related to a price difference between a previously selected delivery container and the newly selected delivery container selected is obtained and presented to the user in accordance with prescribed display methods.

17 Claims, 10 Drawing Sheets

FIG. 3

PRODUCT DATABASE  33

| NO. | PRODUCT NAME | UNIT PRICE | VOLUME | MAXIMUM DIMENSION | NO. OF STOCKS | RELATED HP |
|---|---|---|---|---|---|---|
| 001 | DRY BATTERY (D SIZE × 2) | 198 | 15 cc | 5 cm | 169 | http://www... |
| 002 | DRY BATTERY (C SIZE × 4) | 168 | 12 cc | 5 cm | 281 | http://www... |
| 003 | ... | ... | ... | | | |

FIG. 4

DELIVERY CONTAINER DATABASE 34

| NO. | TYPE | UNIT PRICE (SHIPPING FEE INCLUDED) | INTERNAL CAPACITY | INTERNAL DIMENSIONS (WIDTH × DEPTH × HEIGHT) |
|---|---|---|---|---|
| 001 | SS | 50 | 120cc | 6 × 5 × 4 cm |
| 002 | S | 100 | 640cc | 10 × 8 × 8 cm |
| 003 | MS | 200 | 3600cc | 20 × 15 × 12 cm |
| 004 | M | ⋮ | | |
| 005 | ML | ⋮ | | |
| 006 | L | ⋮ | | |
| 007 | LL | ⋮ | | |
| ⋮ | | | | |

F I G. 5

| DELIVERY NETWORK DATABASE | | | | | | 35 |
|---|---|---|---|---|---|---|
| NO. | | ADDRESS | DELIVERY SOURCE LOCATION | DELIVERY CENTER | CLOSING TIME | SOURCE LOCATION'S HP |
| 0 0 1 1 | 001-0011 | YUKIMI-CHO, KITA-KU, SAPPORO, HOKKAIDO | YUKIMI BRANCH | SAPPORO CHUO | 10:20, 13:45, 16:30 | http://····· |
| 0 0 1 2 | 001-0012 | SUZURAN-CHO, KITA-KU, SAPPORO, HOKKAIDO | SUZURAN BRANCH | SAPPORO CHUO | 10:20, 13:45, 16:30 | http://····· |
| ⋮ | ⋮ | ⋮ | | | | |

F I G. 6

| USER INFORMATION DATABASE | | | | | | | |
|---|---|---|---|---|---|---|---|
| USER ID | NAME | ADDRESS | TEL | FAX | DELIVERY SOURCE LOCATION | TYPE OF PAYMENT | UNDISPATCHED ORDER |
| A B C 1 2 3 4 | HANAKO YAMADA | ···, TOKYO | 03··· | 03··· | NAGATA-CHO KITA BRANCH, TOKYO | CREDIT CARD | PRESENT (CODE 9876) |
| A B C 1 2 3 5 | ICHIRO SUZUKI | ···, TOKYO | 03··· | 03··· | SHINAGAWA EKIMAE BRANCH, TOKYO | COD | NONE |
| ⋮ | ⋮ | ⋮ | | | | | |

USER ID : A B C 1 2 3 4        CLOSING TIME 1 6 : 2 0
DELIVERY SOURCE LOCATION:            1 HR. 40 MIN. LEFT
SHINAGAWA EKIMAE BRANCH, TOKYO

| PRODUCT NAME | UNIT OF PRICE | QUANTITIES | SUBTOTAL |
|---|---|---|---|
| ☐ DRY BATTERY (AA SIZE × 4 PCES) | 98 YEN | 2 | 186 YEN |
| ☐ 12 ROLLS OF TOILET PAPER | 258 YEN | 1 | 258 YEN |
| ☐ 10 KG OF RICE (SASANISHIKI) | 3980 YEN | 1 | 3980 YEN |

CONTAINER    PREVIOUS S 150 YEN (+50 YEN)    M ★ 200 YEN
(SHIPPING FEE INCLUDED)
                                    CONSUMPTION TAX    221 YEN
                                         TOTAL        4555 YEN

[ ADD ]    [ DELETE ]    [ CHECKOUT ]

ONLINE SHOPPING SYSTEM, INFORMATION PROCESSING APPARATUS AND METHOD, AND INFORMATION PROCESSING PROGRAM RECORDING MEDIUM

BACKGROUND OF THE INVENTION

1. Field of the Invention

The present invention relates to an online shopping system, an information processing apparatus, an information processing method, and an information processing program recording medium. More particularly, the present invention relates to: an online shopping system in which products are ordered by users via terminal apparatuses, such as personal computers (PCs), mobile phones, etc., which can be connected to a network such as the internet, and the ordered products are delivered to the users; an information processing apparatus included in the same system; an information processing method for use in the same apparatus; and a medium in which an information processing program is recorded for performing the same method.

2. Description of the Background Art

Online shopping using the internet and the like has seen a sharp increase in the amount of product transactions in recent years. Such online shopping has advantages over conventional home shopping using magazines and television broadcasting (TV broadcasting), for example, in that users can obtain a great deal of information they need and, unlike shopping in a store, the users can have enough time to compare various types of products and consider a purchase without feeling constraint in front of a salesclerk. On the other hand, from the viewpoint of sellers, online shopping has an advantage in that, unlike conventional home shopping using magazines and TV broadcasting, no advertisement cost is required, and the number of salesclerks does not have to be as large as that required in a store, whereby it is possible to reduce operating costs.

In recent years, as typified by "i-mode" (a mobile internet access system in Japan), mobile phones have become capable of being connected to the internet to interactively exchange information. Therefore, it is conceivable that the amount of transactions via online shopping using mobile phones will be increased in the future. Further, with the prevalence of accumulated information distribution via broadcasting such as "ep" (a communication satellite digital broadcasting service in Japan), it is conceivable that online shopping using television sets, rather than PCs, as the terminal apparatuses, will be increased.

It can be expected that, as such online shopping progresses, the users will utilize online shopping for buying daily commodities. In such a case, if the users are charged with a shipping fee based on a conventional shipping charge scheme as currently employed in online shopping using the internet (e.g., the shipping fee is different in different delivery areas), it would be disadvantageous for the users to buy daily commodities since the ratio of the shipping fee to the entire product cost can be high. There is also a scheme in which the users are charged with a fixed shipping fee regardless of delivery areas. However, in the case where a product to be handled is large unlike a small item such as a book, unevenness in transportation cost cannot be equalized only by the fixed shipping fee, posing a burden on the seller. Accordingly, online shopping is believed to be unsuitable for buying daily commodities. Thus, in order to deal with an increase in quantity of daily commodities to be delivered, the seller is required to dedicate efforts to reducing the transportation cost.

One method for reducing the transportation cost uses a technique for standardizing sizes of containers used for delivering merchandise (delivery containers). By standardizing the sizes of the delivery containers, wasted space is eliminated from packing for transportation, thereby increasing transportation efficiency. An example of a conventional method for online shopping using such a technique is disclosed in Japanese Patent Laid-Open Publication No. 2001-319106. This publication discloses a technique in which the user previously selects a delivery container and then selects products which can be delivered in that delivery container. This conventional online shopping method is described below with reference to FIG. 10.

When the user starts a procedure for ordering products, a container selection screen is displayed (step S101). The user selects any one of delivery containers displayed on the screen (step S102). Then, a screen for prompting the user to select a product type is displayed (step S103). The user refers to the screen and selects a product type to order (step S104). Next, information about products whose type is selected by the user is read from a server (step S105), and the maximum quantity of each of the selected type of products which can be stored in the selected delivery container is calculated based on the available capacity of the delivery container (step S106). At this point, whether or not there is any product whose maximum quantity is equal to or more than one is determined (step S107). If there is not such a product, the procedure returns to the product type selection screen (to step S103). If there is such a product, a selection screen for selecting individual products is displayed (step S108). The user selects a product and inputs a quantity (step S109). Thereafter, the available capacity of the delivery container is calculated based on the input (step S110), and the procedure returns to step S106 to recalculate the maximum quantities of other products of the selected type are recalculated (at step S106).

In this conventional online shopping method, however, the user is required to select the delivery container before deciding which product to purchase, and this is inconvenient to the user. This method also has a problem in that if there are too many types of standardized delivery containers, the user might not be able to select an optimal delivery container or it might take significant time and effort to select such a container. The conventional online shopping method is effective in the case where the number of types of both products to be selected and delivery containers is small, but is not effective in the case where the number of the types of both the products and the delivery containers is large.

In the online shopping system, generally, products are collectively procured and dispatched by a delivery center or the like, and in actuality, there is a closing time for ordering products. In the conventional online shopping system, however, information about the closing time is not clearly stated to the user at the time of ordering the products. This is because, in conventional online shopping, typically, it takes several days before the products are delivered to the user and the closing time is not much of a concern. However, in consideration of online shopping handling daily commodities, such as food, it can be expected that same day delivery will become widely available. In such a case, whether or not an order is placed in time for the closing time is very important.

Further, in general, information about a delivery source location from which products are delivered to users is not clearly stated to the users. Therefore, for example, some users, who use online shopping for the first time, have feelings of anxiety, e.g., "no product might be delivered after paying the charge", "inferior products might be delivered", and so on. Note that, in some cases, an online shopping system allows the user to locate a product by a cargo number after the product has been dispatched and obtain the telephone number, etc., of the delivery source location. However, no conventional systems clearly denote such information on the screen beforehand when the product is ordered.

SUMMARY OF THE INVENTION

Therefore, an object of the present invention is to provide an online shopping system which is capable of: minimizing transportation costs by using a plurality of prestandardized delivery containers so as to eliminate waste in product delivery; and enhancing the convenience of the users by automatically selecting a delivery container in accordance with the size of a selected product and clearly denoting information about an order closing time, a delivery source location, etc.

Another object of the present invention is to provide an information processing apparatus for use in the same online shopping system.

Still another object of the present invention is to provide an information processing method for use with the same information processing apparatus.

Still another object of the present invention is a recording medium having an information processing program stored therein.

The present invention has the following features to attain the objects mentioned above.

A first aspect of the present invention is directed to an information processing apparatus for performing a process required for delivering a product to a user which is ordered by the user via a terminal apparatus connected to a network, with the product being stored in any one of a plurality of types of prestandardized delivery containers.

The information processing apparatus according to the first aspect comprises: an information storing section for storing product information related to a plurality of types of products, where the product information includes at least information about product volumes, and delivery container information related to the plurality of types of prestandardized delivery containers, where the delivery container information includes at least information about internal capacities and prices of the delivery containers; a receiving section for receiving information related to a product order from the terminal apparatus; a first processing section for automatically selecting a delivery container that is capable of storing all of the ordered products based on the product information and the delivery container information each time the receiving section receives a product order; a second processing section for obtaining, based on the delivery container information, information related to a price difference between a new delivery container selected anew by the first processing section and an old delivery container previously selected by the first processing section; and a transmitting section for transmitting, to the terminal apparatus, the information related to the price difference obtained by the second processing section.

Thus, according to the first aspect, a delivery container which is optimal for ordered products is automatically selected based on the product information and the delivery container information that is prestored in the information storing section, and therefore, the users are free from both-ersome ordering procedures which require the user to consider the sizes of the products and delivery containers. Further, the user can always recognize the size and price of the delivery container each time the user places an order for a product, and therefore, the delivery cost can be kept low by increasing the quantity of products so as not to change the price of the delivery container and ordering multiple products at a time (as commodity stockpile or the like). This allows the product deliverer to enhance transportation efficiency, and therefore, energy savings and reduction in environmental impact can be realized.

The information related to the price difference that the transmitting section transmits to the terminal apparatus may preferably be a balance between prices of the new delivery container and the old delivery container or both the prices of the new delivery container and the old delivery container. In the case where there is a price difference between the new delivery container and the old delivery container, the information related to the price difference may be an instruction to display a specific symbol, which represents an existence of the price difference, on a screen. In the case where the delivery container information stored in the information storing section further includes a prescribed mark indicating a delivery container type, the information related to the price difference may be an instruction to display a symbol representing the new delivery container and a symbol representing the old delivery container on the screen.

The first processing section may preferably select, as an optimal delivery container, a delivery container having the smallest internal capacity or a delivery container having the lowest price from among the delivery containers that are capable of storing an ordered product.

It is more preferable that the delivery containers are standardized so as to be in a relationship that each of a width, a depth, and a height of one type of delivery container are a multiple or a submultiple of a corresponding dimension of other types of delivery containers.

Thus, by standardizing the sizes of the plurality of delivery containers, no transportation wastes are caused at the time of product delivery, and therefore, the seller can reduce the entire transportation cost. This allows the product deliverer to enhance transportation efficiency, and therefore, energy savings and a reduction in an environmental impact can be realized.

In the first aspect, when the information storing section further includes user information including at least information about a delivery source location responsible for delivery to the user and delivery network information including at least information about a closing time for loading at the delivery source location, the second processing section can further obtain information about an order closing time, which allows the product to be delivered to the user in a minimum amount of time, based on the user information and the delivery network information. In addition, the transmitting section can further transmit, to the terminal apparatus, the information about the order closing time obtained by the second processing section and/or information about a remaining time from the current time to the order closing time.

Thus, the user is made aware of the order closing time or the remaining time, and therefore, it is possible to achieve an advantageous effect that an additional order or an order cancellation can be done timely and efficiently. This also allows orders to be put together as one, and therefore, the product deliverer is allowed to enhance transportation efficiency, thereby realizing energy savings and a reduction in an environmental impact.

Furthermore, in the first aspect, when the information storing section further stores specific information related to the delivery source location, the transmitting section may be capable of transmitting the specific information to the terminal apparatus on demand from the user. The specific information may include at least one of an address, a telephone number, business hours and an owner's name of the delivery source location, and a product directly sold by the delivery source location.

Thus, it is possible to obtain specific information about the delivery source location, whereby it is possible to achieve an advantageous effect such that the user can order products without anxiety.

A second aspect of the present invention is directed to an information processing apparatus for performing a process required for delivering to a user a product, which is ordered by the user via a terminal apparatus connected to a network.

The information processing apparatus according to the second aspect comprises: an information storing section for storing user information including at least information about a delivery source location responsible for delivery to the user, and delivery network information including at least information about a closing time for loading at the delivery source location; a receiving section for receiving information related to a product order from the terminal apparatus; a processing section for obtaining information about an order closing time, which allows the product to be delivered to the user in a minimum amount of time, based on the user information and the delivery network information; and a transmitting section for transmitting, to the terminal apparatus, the information about the order closing time obtained by the processing section and/or information about a remaining time from the current time to the order closing time.

Thus, the user is made aware of the order closing time or the remaining time, and therefore, it is possible to achieve an advantageous effect that an additional order or an order cancellation can be done timely and efficiently. This also allows orders to be put together as one, and therefore, the product deliverer is allowed to enhance transportation efficiency, thereby realizing energy savings and a reduction in an environmental impact.

Furthermore, in the second aspect, when the information storing section further stores specific information related to the delivery source location, the transmitting section may be capable of transmitting the specific information to the terminal apparatus on demand from the user. The specific information may include at least one of an address, a telephone number, business hours and an owner's name of the delivery source location, and a product directly sold by the delivery source location.

Thus, it is possible to obtain specific information about the delivery source location, whereby it is possible to achieve an advantageous effect such that the user can order products without anxiety.

A third aspect of the present invention is directed to an online shopping system in which an information processing apparatus owned by a seller is connected to a terminal apparatus available to a user via a network, and a product which is ordered by a user via the terminal apparatus is delivered to the user, where the product is stored in any one of a plurality of types of prestandardized delivery containers which is selected by the information processing apparatus.

In the online shopping system according to the third aspect, the terminal apparatus comprises: an input section capable of inputting information required for ordering the product; a communication section for transmitting to/receiving from the information processing apparatus information related to a product order; and a display section for displaying the information related to the product order.

The information processing apparatus comprises: an information storing section for storing product information related to a plurality of types of products, where the product information includes at least information about product volumes, and delivery container information related to the plurality of types of prestandardized delivery containers, where the delivery container information includes at least information about internal capacities and prices of the delivery containers; a receiving section for receiving information related to the product order from the terminal apparatus; a first processing section for automatically selecting a delivery container that is capable of storing all of the ordered products based on the product information and the delivery container information each time the receiving section receives a product order; a second processing section for obtaining, based on the delivery container information, information related to a price difference between a new delivery container selected anew by the first processing section and an old delivery container previously selected by the first processing section; and a transmitting section for transmitting, to the terminal apparatus, the information related to the price difference obtained by the second processing section so as to display the information on the display section.

A fourth aspect of the present invention is directed to an online shopping system in which an information processing apparatus owned by a seller is connected to a terminal apparatus available to a user via a network, and a product which is ordered by a user via the terminal apparatus is delivered to the user.

In the online shopping system according to the fourth aspect, the terminal apparatus comprises: an input section capable of inputting information required for ordering the product; a communication section for transmitting to/receiving from the information processing apparatus information related to a product order; and a display section for displaying the information related to the product order.

The information processing apparatus comprises: an information storing section for storing user information including at least information about a delivery source location responsible for delivery to the user, and delivery network information including at least information about a closing time for loading at the delivery source location; a receiving section for receiving information related to the product order from the terminal apparatus; a processing section for obtaining information about an order closing time, which allows the product to be delivered to the user in a minimum a mount of time, based on the user information and the delivery network information; and a transmitting section for transmitting to the terminal apparatus the information about the order closing time obtained by the processing section so as to display the information on the display section.

A fifth aspect of the present invention is directed to an information processing method performed in an online shopping system in which a product that is ordered by a user via a network is delivered to the user, where the product is stored in any one of a plurality of types of prestandardized delivery containers.

The information processing method according to the Fifth aspect comprises the steps of: receiving a product order from the user; automatically selecting a delivery container that is capable of storing the ordered product from among the plurality of types of prestandardized delivery containers based on a volume of the product and an internal capacity of the delivery container, and obtaining a price of the delivery container; reselecting a new delivery container that is capable of storing all of the ordered products including an additionally ordered product each time an additional product is ordered, and obtaining a price of the new delivery container; obtaining information related to a price difference between the new delivery container selected in accordance with the additional order and a previously selected old delivery container; and presenting the obtained information related to the price difference to the user.

A sixth aspect of the present invention is directed to an information processing method performed in an online shopping system in which a product that is ordered by a user via a network is delivered to the user.

The information processing method according to the sixth aspect comprises the steps of: receiving a product order from the user; when the product order is received from the user, obtaining information about an order closing time, which allows the product to be delivered to the user in a minimum amount of time, based on information about a delivery source location responsible for delivery to the user and information about a closing time for loading at the delivery source location; and presenting the obtained information about the closing time to the user.

A seventh aspect of the present invention is directed to a recording medium having an information processing method stored therein as a program which can be executed by a computer. The method is performed in an online shopping system in which a product that is ordered by a user via a network is delivered to the user, and the product is stored in any one of a plurality of types of prestandardized delivery containers.

The program stored in the recording medium according to the seventh aspect comprises the steps of: receiving a product order from the user; automatically selecting a delivery container that is capable of storing the ordered product from among the plurality of types of prestandardized delivery containers based on a volume of the product and an internal capacity of the delivery container, and obtaining a price of the delivery container; reselecting a new delivery container that is capable of storing all of the ordered products including an additionally ordered product each time an additional product is ordered, and obtaining a price of the new delivery container; obtaining information related to a price difference between the new delivery container selected in accordance with the additional order and a previously selected old delivery container; and presenting the obtained information related to the price difference to the user.

An eighth aspect of the present invention is directed to a recording medium having an information processing method stored therein as a program which can be executed by a computer. The method is performed in an online shopping system in which a product that is ordered by a user via a network is delivered to the user.

The program stored in the recording medium according to the eighth aspect comprises the steps of: receiving a product order from the user; when the product order is received from the user, obtaining information about an order closing time, which allows the product to be delivered to the user in minimum time, based on information about a delivery source location responsible for delivery to the user, and information about a closing time for loading at the delivery source location; and presenting the obtained information about the closing time to the user.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram illustrating an example of a product database 33;

FIG. 4 is a diagram illustrating an example of a delivery container database 34;

FIG. 5 is a diagram illustrating an example of a delivery network database 35;

FIG. 6 is a diagram illustrating an example of a user information database 36;

FIG. 8 is a diagram illustrating an example of a screen displayed on a terminal apparatus after a product order has been input;

DETAILED DESCRIPTION OF THE PREFERRED EMBODIMENTS

Figure 1:
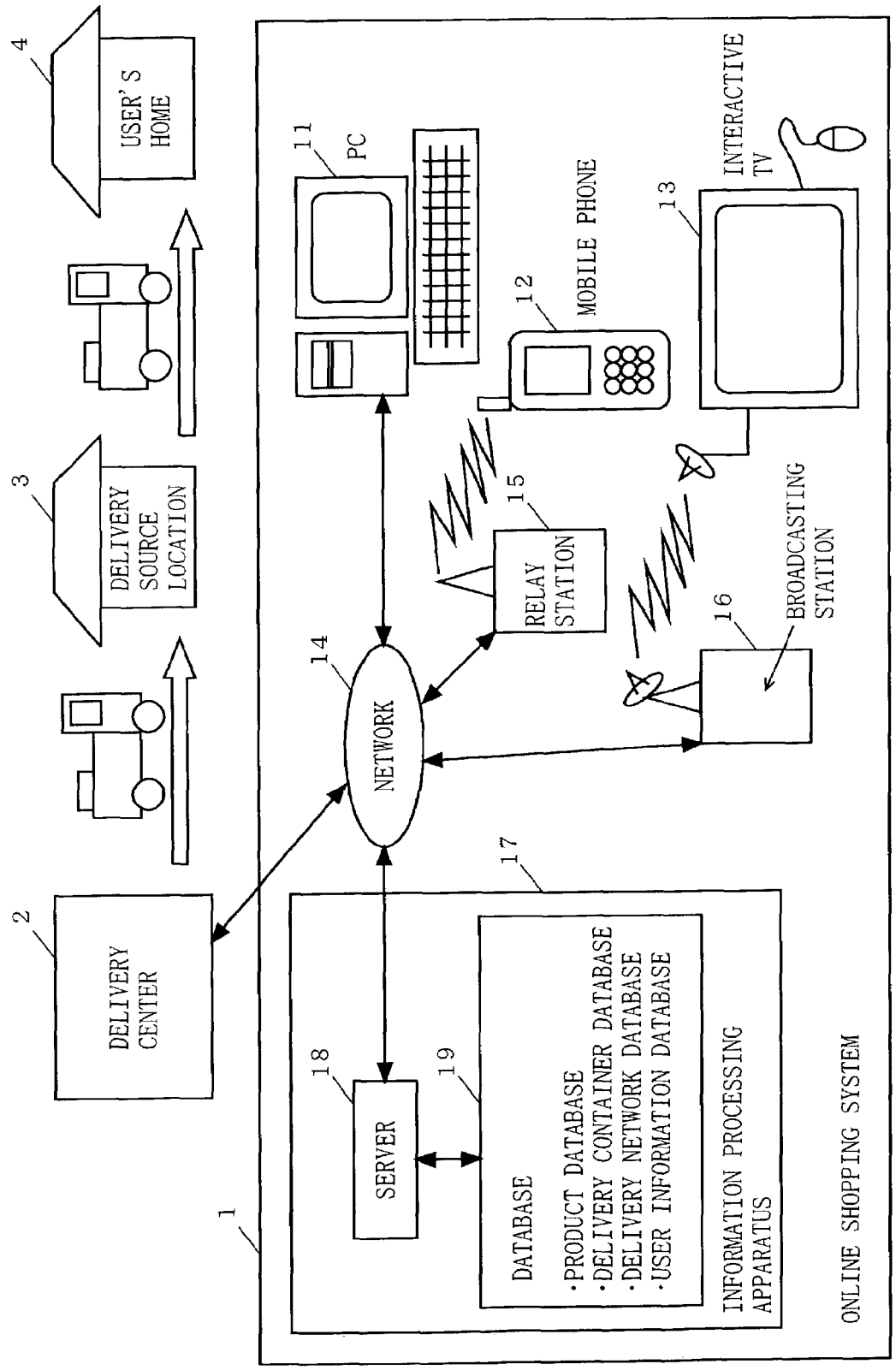
FIG. 1 is a diagram illustrating a configuration of an online shopping system according to an embodiment of the present invention and a distribution process.

Hereinafter, embodiments of the present invention will be described below with reference to FIGS. 1 to 9. Like reference numerals shown in the drawings denote similar functions.

FIG. 1 is a diagram illustrating a configuration of an online shopping system according to an embodiment of the present invention and a distribution process. In FIG. 1, an online shopping system 1 is configured such that a network 14, such as the internet, is connected to a PC 11, a portable phone 12, or interactive TV 13, which serves as an online shopping terminal apparatus owned by a user, and an information processing apparatus 17 owned by a seller. The information processing apparatus 17 is connected to a delivery center 2 via the network 14. A prescribed distribution path is established from the delivery center 2 to the user's home 4 via the delivery source location 3.

The online shopping system according to an embodiment of the present invention will be generally described.

In the case of placing an order for a product in the online shopping system, the user connects, via the network 14, either one of the PC 11, the mobile phone 12, and the interactive TV 13, which are the online shopping terminal apparatuses, to the information processing apparatus 17 owned by the seller dealing the product to exchange prescribed information with the information processing apparatus 17. For example, connections to the network 14 are performed via a telephone line or optical fiber network when the PC 11 is used, via a relay station 15 when the mobile phone 12 is used, or via a broadcasting station 16, a telephone line network, or a CATV network when the interactive TV 13 is used. The online shopping terminal apparatus includes an input section capable of inputting information that is required for placing an order for product, a communication section for transmitting to/receiving from information about the ordered product, and a display section for displaying the information about the ordered product.

The information processing apparatus 17 includes a server 18 for processing a product order from the user, and a database 19 having various data required for online shopping stored therein. Upon receipt of the product order from the user, the information processing apparatus 17 conveys information about the order to the delivery center 2 via the network 14. The delivery center 2 organizes contents of a plurality of orders to collectively prepare products and dispatch the products to respective delivery source locations 3. Each delivery source location 3 delivers the products dispatched from the delivery center 2 to a user's home 4.

Figure 2:
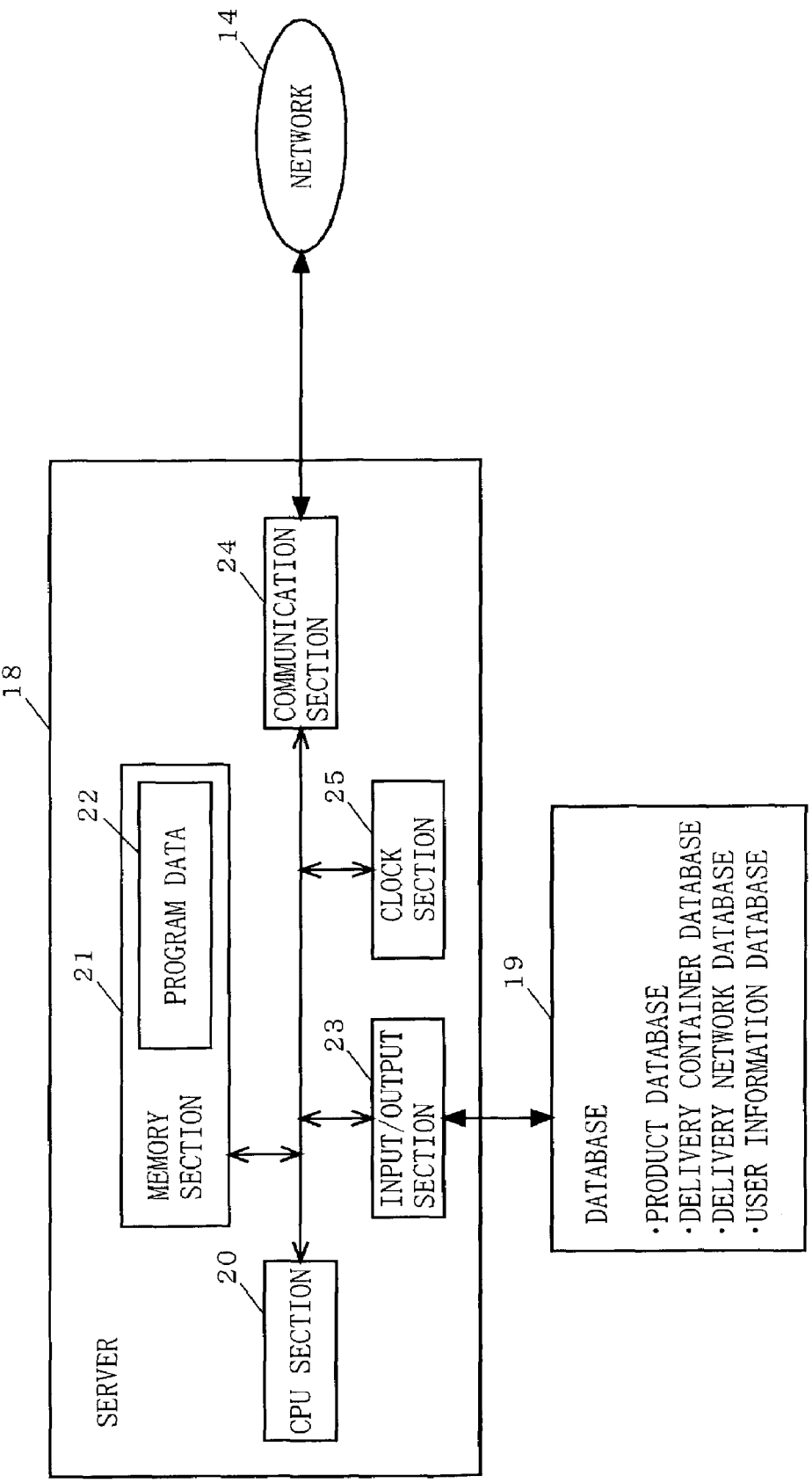
FIG. 2 is a block diagram illustrating a detailed configuration of a server 18.

FIG. 2 is a block diagram illustrating a general configuration of the server 18. In FIG. 2, the server 18 includes a CPU section 20, a memory section 21, an input/output section 23, a communication section 24, and a clock section 25. The communication section 24 transmits/receives information to/from the online shopping terminal apparatus via the network 14. The memory section 21 stores program data 22 that is used for performing a process featured by the present invention and temporally stores information under processing. The CPU section 20 suitably performs the program of the program data 22 stored in the memory section 21 to process information received by the communication section 24, and transmit required information from the communication section 24. The input/output section 23 exchanges information with the database 19. The clock section 25 keeps the current time and outputs the current time upon the request of the CPU section 20. Each function of a transmitting section, a receiving section, an information storing section, and first and second processing sections is realized by the CPU section 20, the memory section 21, the input/output section 23, the communication section 24, the clock section 25, and the database 19.

The database 19 has the following databases stored therein: a product database 33 in which product information is stored (FIG. 3); a delivery container database 34 in which delivery container information is stored (FIG. 4); a delivery network database 35 in which information about product delivery network is stored (FIG. 5); and a user information database 36 in which information about user addresses, user purchase histories, etc., is stored (FIG. 6).

Referring to FIG. 3, the product database 33 includes, as a series of records, a serial number, a name, a price, a volume, a maximum length, number of stocked products, and an address of a homepage (HP) from which detailed information can be obtained for each product to be sold.

Referring to FIG. 4, the delivery container database 34 includes, as a series of records, a serial number, a type, a price including shipping fees, a capacity, and internal dimensions for each pre-standardized delivery container. Note that the delivery container for use in the system of the present invention is not limited to box-like containers as those having the sizes illustrated in FIG. 4, and may be an envelope-like container.

Referring to FIG. 5, the delivery network database 35 includes, as a series of records, a serial number, an address, and a name of a delivery source location, an HP address from which detailed information can be obtained, and a name and the closing time of the controlled delivery center for each prescribed delivery network. The term "closing time" described herein refers to an order closing time for product delivery determined for each delivery truck, i.e., the time by which products can be loaded onto delivery trucks which depart from the delivery center 2.

Referring to FIG. 6, the user information database 36 includes, as a series of records, a unique identification number (ID), a name, an address, a telephone number, a fax number, a delivery source location, a payment method, and dispatch status for each user. In this manner, the user information database 36 manages information about optimal delivery source locations based on addresses of the users.

The delivery containers managed by the delivery container database 34 are preferably standardized so as to have the following sizes.

In the present invention, an ordered product is contained in any one of delivery containers having various sizes, and the delivery container is loaded onto a transportation truck for delivery. Accordingly, in order to realize savings in time and effort associated with transportation at the time of delivery, respective sizes of the delivery containers are standardized such that there are no wasted spaces even if a plurality of delivery containers having various sizes are combined and loaded onto the transportation truck. Specifically, the delivery containers are related to each other such that their respective widths, depths, and lengths are multiples or submultiples of corresponding dimensions of other delivery containers. For example, the height, the width, and the depth of a combination of two L-size delivery containers are respectively identical to the height, the width, and the depth of a combination of three M-size delivery containers and to a combination of four S-size delivery containers. Moreover, when the plurality of delivery containers have a combined size so as to be fit in the load-carrying area of the transportation truck, it is possible to load the delivery containers into the load carrying area of the transportation track without wasting spaces. Thus, the quantity of the delivery containers (i.e., products) which can be transported by one transporting truck is increased, thereby reducing the delivery cost per delivery container.

Figure 7:
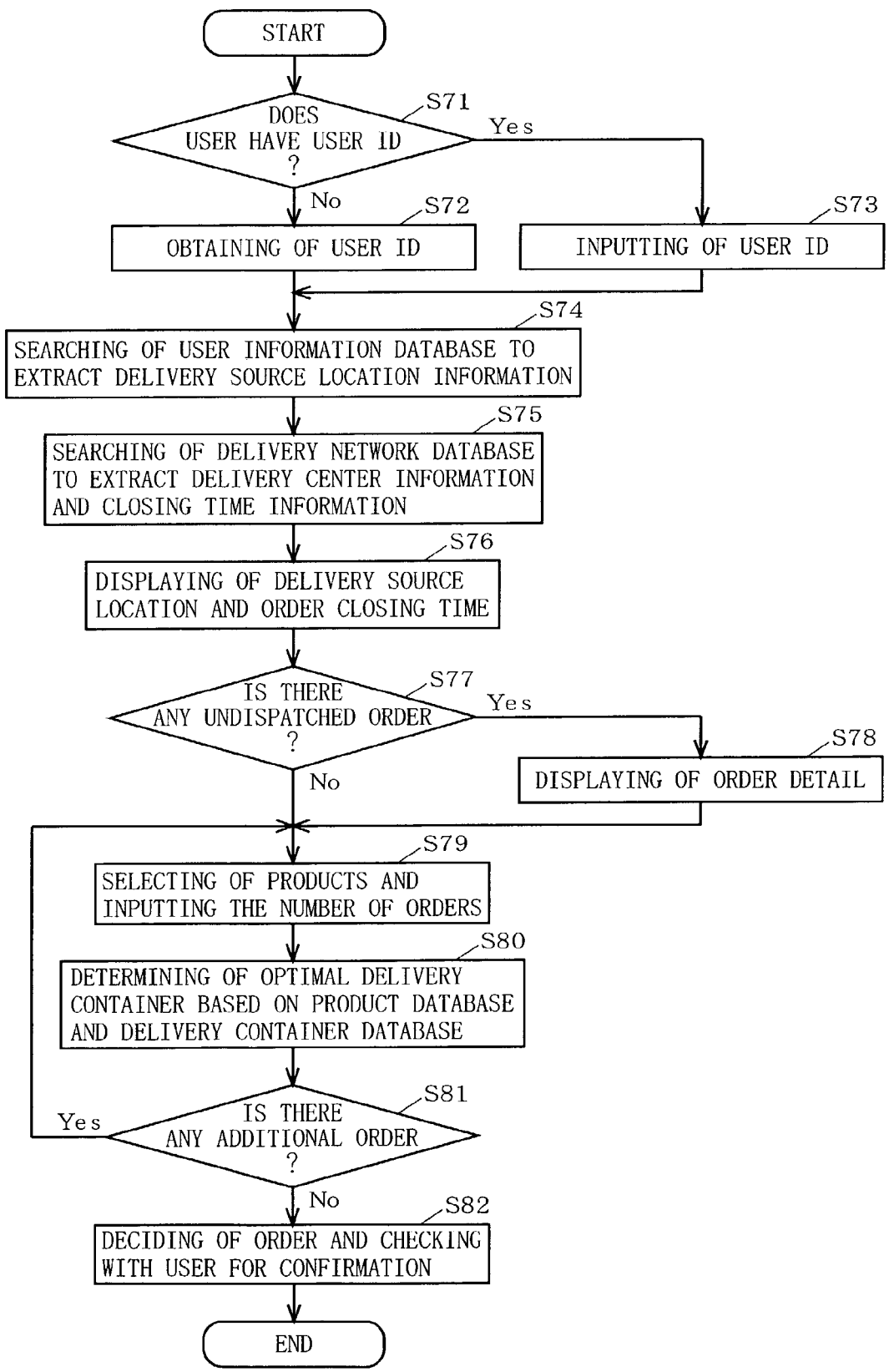
FIG. 7 is a flowchart illustrating the procedure where a product is ordered by the user.

An online shopping method performed in an online shopping system according to an embodiment of the present invention will now be described with reference to FIGS. 7 and 8. FIG. 7 is a flowchart illustrating the procedure where a product is ordered by the user in the case where the PC 11 is used as a terminal apparatus. Note that the procedure illustrated in FIG. 7 is the same as that for the case where the terminal apparatus is the mobile phone 12 or the interactive TV 13. FIG. 8 is a diagram illustrating, by way of example, a window screen displayed on the PC 11 after some product orders have been input.

When the PC 11 is connected to the information processing apparatus 17, the seller asks the user whether or not the user has a user ID (step S71). At this point, any user who does not have his/her own user ID provides the seller with personal information required for constructing the user information database 36 and obtains a user ID (step S72). On the other hand, any user who already has his/her own user ID inputs the user ID to the PC 11 (step S73).

After having received the newly created user ID or the input user ID, the server 18 searches the user information database 36 of the database 19 to extract a delivery source location for delivering the product to the user's address (step S74). Next, the server 18 searches the delivery network database 35 to extract information 54 about a delivery center that is responsible for transfer to the delivery source location and the closing time of the delivery center, and determines the nearest closing time after the current time as an order closing time 55 (step S75). Then, the server 18 displays on the screen of the user's PC 11 the extracted information 54 about the delivery source location and the extracted order closing time 55 as well as the user ID 53 (step S76 and FIG.

8). Such a display allows the user to recognize the time by which orders should be established in order to receive a product in the shortest period of time and also recognize how much time is left until then.

A remaining time 56 from the current time to the closing time (FIG. 8) may be displayed together with the closing time 55 itself as the order closing time. By clicking the user ID 53 and the delivery source location 54 (instruction, selection, or execution by using a mouse or the like), it is possible to confirm/change the user information and see the delivery source location information.

Next, the server 18 performs a process for causing the user to select the products to order and deciding on a delivery container which is optimal for the selected products in the following manner.

First, the server 18 determines whether or not there are any undispatched orders which have already been placed by the user but have not been processed yet (step S77). If there is an undispatched order, before the user places an order for other products, the server 18 displays on the screen of the PC 11 the details of the order having already been placed as well as the type and price of the delivery container used for delivery (step S78). The user confirms the details of the order having already been placed, if any, and places a new order for other products (step S79). This is performed by selecting a product to order from among products which are searched and listed, for example, and inputting the quantity of the product. After information related to the ordered product, i.e., the quantity of the ordered product, is input, the server 18 obtains information corresponding to the ordered product, e.g., volume information, etc., which will be described later, from the product database 33 of the database 19 and determines a delivery container which is optimal for a combination of the product selected anew and the product having already been ordered (step S80).

The procedure by which the server 18 determines the optimal delivery container is now described by way of example.

The server 18 obtains volume information for each ordered product from the product database 33 and calculates a product-by-product volume by multiplying a value of the volume information with the quantity of ordered products. Then, the server 18 calculates the total volume by obtaining a sum of the product-by-product volumes calculated on a product-by-product basis. Next, the server 18 compares the calculated total volume with information about a capacity of each delivery container stored in the delivery container database 34 to determine a delivery container having the smallest size among other delivery containers that are capable of receiving (containing) the total volume. Note that some products have characteristic shapes, and therefore, in some cases, the type of the delivery containers may not be determined simply based on the total volume. In such a case, the server 18 redetermines the delivery container. For example, in the case where the maximum length of a product exceeds any one of the internal dimensions of the determined delivery container, a delivery container that is capable of containing the product is redetermined based on maximum length information obtained from the product database 33.

When the type of the delivery container is determined, the server 18 calculates prices of ordered products 57 and a price 60 of the delivery container, and displays the prices along with the details 57 of the ordered products and the type 59 of the delivery container on the screen of the user's PC 11 (FIG. 8). At this point, in the case where other products are already input (in the case of Yes at step S77), the type 61 and the price 62 of delivery container determined before the addition of products are displayed as well as the type 59 and the price 60 of the delivery container determined after the addition of products (FIG. 8). In this case, a price difference 63 between two delivery containers may be displayed. Alternatively, in the case where the price difference 63 between two delivery containers is not zero and the type of delivery container is changed, a prescribed symbol 64 may be displayed. The types 59 and 61 of delivery containers, the prices 60 and 62 of delivery containers, the price difference 63 and the symbol 64 can be freely combined and displayed. Regarding the type 61 and the price 62 of the delivery container determined before the addition of products, information which is previously stored in the server 18 at the previous order is used.

In this manner, prices of delivery containers before and after the addition of products are compared and displayed, and therefore, the user can recognize the variation in the price of delivery container which may be caused by additions of products.

In FIG. 8, by clicking a name of an ordered product 57, detailed information of the ordered product can be viewed. Further, by clicking an add button 67, a product can be additionally ordered. Furthermore, by checking a check box on the left of a name of an ordered product and clicking a cancel button 68, the ordered product can be cancelled. Further still, by clicking a checkout button 69, the order is determined and a confirmation screen is displayed.

When an optimal delivery container is determined and the screen illustrated in FIG. 8 is presented to the user, the server 18 queries the user as to whether or not there is any other additional order (step S81). If there is an additional order, the type and price of the current delivery container is stored in a memory of the server 18, and the user inputs a selection of a product and the quantity of the ordered product (step S79). In the case where there is no additional order and thus the process for inputting a product order is completed, the user notifies the server 18 that the details of the order are confirmed (step S82). Thereafter, the server 18 checks with the user with respect to the details of the order, a delivery destination, and a payment method, and the product order process is completed (step S82).

Figure 9:
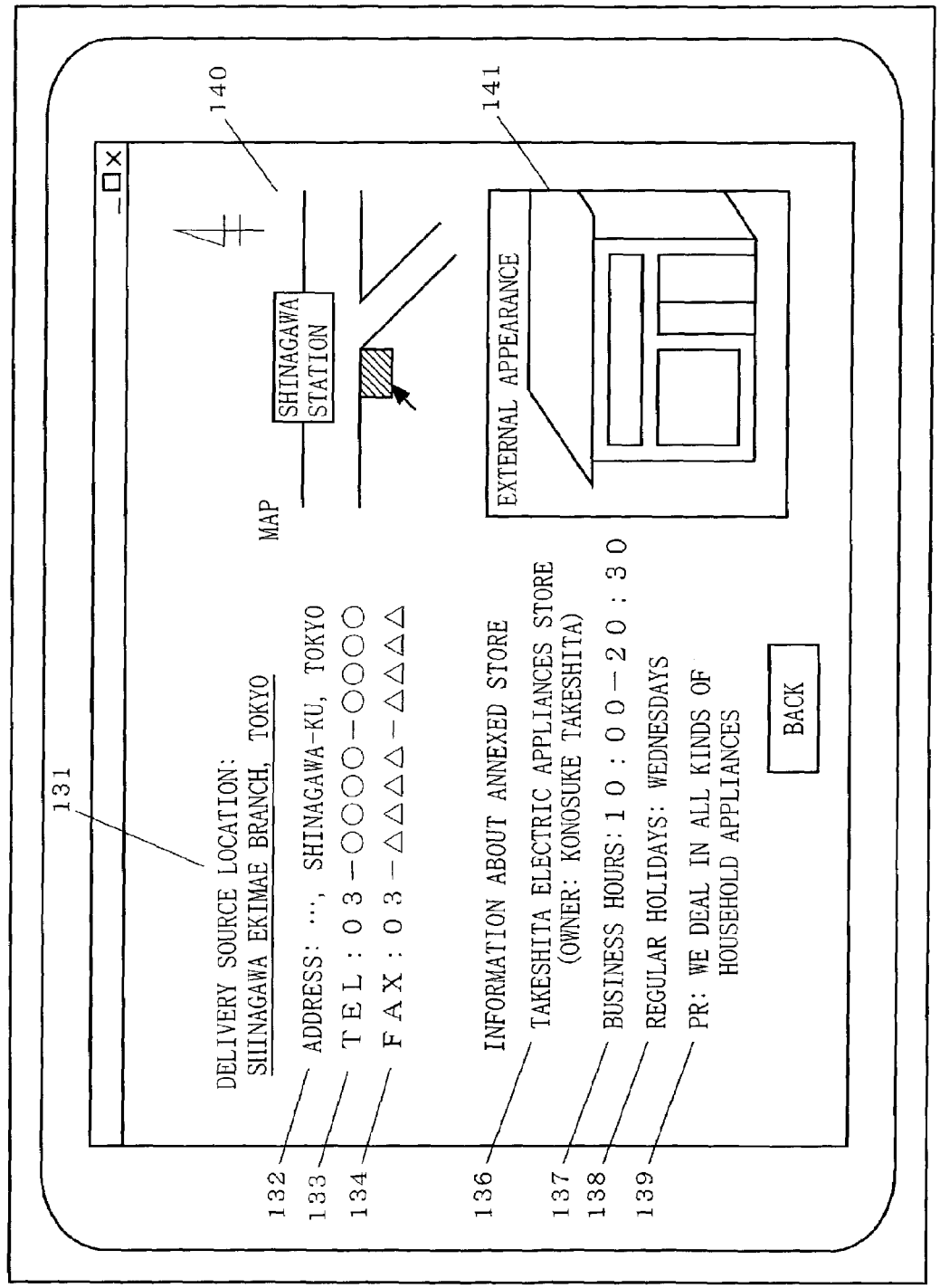
FIG. 9 is a diagram illustrating an example of a screen in which delivery source location information is displayed on a terminal apparatus.
Figure 10:
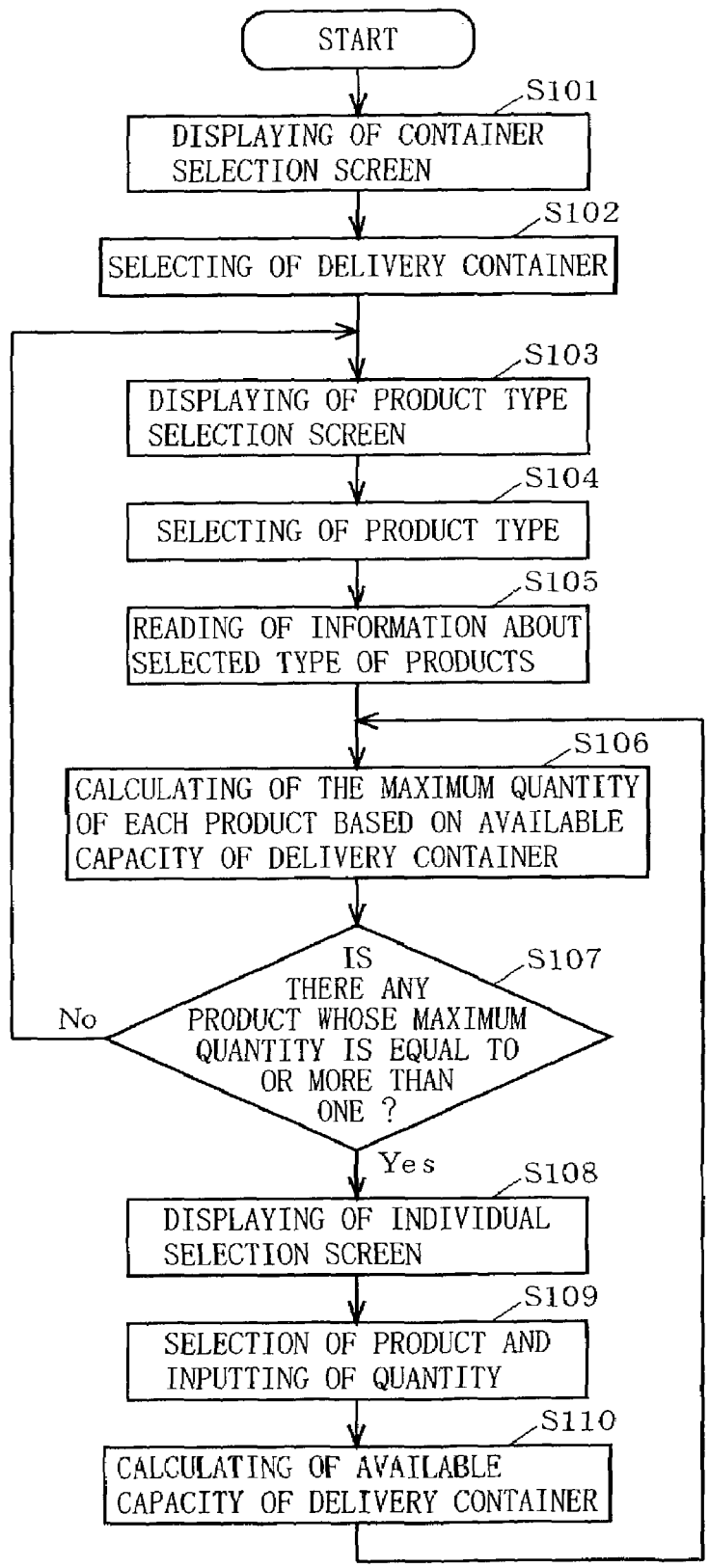
FIG. 10 is a flowchart illustrating the procedure where the user orders a product in accordance with a conventional online shopping system.

The delivery source location information which is displayed by checking the delivery source location 54 on the screen display illustrated in FIG. 8 will now be described. When the delivery source location 54 is clicked, the server 18 refers to the delivery network database 35 and displays information about the delivery source location on the screen of the PC 11 as illustrated in FIG. 9. In FIG. 9, a name 131, an address 132, a telephone number 133, and a fax number 134 of the delivery source location are displayed. Further, in the case where the delivery source location includes individual annexed stores, such as a convenience store, an electric appliance store, a rice store, a liquor store, etc., information about such a store is also displayed. For example, a name 136, a business hour 137, a regular holiday 138, a PR message 139, etc., of the store are displayed. A map 140 indicating a location of the delivery source location and a store appearance image 141 are displayed.

Since the address, name, telephone number, and fax number of the store, the store owner's name, etc., are displayed in the above-described manner, the user can recognize the detailed information of the store. Accordingly, it is easy for the user to make an inquiry and confirmation regarding the products to be delivered, any changes to the delivery time, etc. Further, the business hour, regular holidays, PR messages of the store are displayed, and therefore, necessary information for going shopping directly at the store can be obtained. Furthermore, if bargain product information or the like is displayed as the PR message, the user can buy an inexpensive bargain product. Further still, the map and the appearance image of the store, etc., are displayed, and therefore, the user can recognize a specific delivery source location in the vicinity of his/her own home. These features eliminate the user's anxieties related to online shopping, e.g., "Could the ordered product be really delivered?", "a delivered product might be inferior", "Who answers complaints if any problem occurs?", etc.

As described above, according to the online shopping system according to an embodiment of the present invention, a plurality of delivery containers, which are standardized such that no transportation wastes are caused at the time of product delivery, are used, and therefore, the seller can reduce the entire transportation cost. Further, a delivery container which is optimal for an ordered product is automatically selected based on product information and delivery container information prestored in databases, and therefore, the users are free from bothersome ordering procedures which require the user to consider the sizes of the products and delivery containers. Furthermore, the user can always recognize the size and price of the delivery container each time the user places an order for a product, and therefore, the delivery cost can be kept low by increasing the quantity of products so as not to change the price of the delivery container and ordering multiple products at a time (as commodity stockpile or the like).

As in the case of most conventional online shopping systems, when the user cannot obtain any information about the delivery container, only the seller is able to improve the transportation efficiency. For example, in the case where the user does not know the size of the delivery container in which an ordered product is stored, when the delivery container is capable of storing three products of the same kind as the ordered product, the seller has to optimize the size of the delivery container so as to eliminate wasted space in the delivery container. In order to enhance the efficiency in the individual delivery containers, there is no other way except for classifying the delivery containers by size. However, in the present invention, the user can recognize the efficiency in the delivery container, and it can be expected that the user will make an effort to increase the efficiency in the delivery container. Consequently, general transportation efficiency can be enhanced more than ever. Thus, waste in transportation can be eliminated and energy savings as well as a reduction in an environmental impact can be realized.

Further still, the user is made aware of an order closing time, and therefore, it is possible to achieve an advantageous effect in that an additional order or an order cancellation can be done timely and efficiently. This also allows orders to be put together as one, and therefore, transportation efficiency is increased, thereby realizing energy savings and a reduction in an environmental impact. Moreover, it is possible to obtain specific information about the delivery source location, whereby it is possible to achieve an advantageous effect such that the user can order products without anxiety.

The present embodiment has been described with respect to an example where a product's volume is used as information for determining the optimal delivery container. However, in order to determine an optimal delivery container, a product's weight, the sum of the product's three dimensions, the product's maximum dimension, etc. may be stored in databases so as to be compared with the delivery container's maximum allowable load, the delivery container's internal dimensions, etc.

The present embodiment has also been described with respect to the online shopping system to which a technique for automatically selecting a delivery container which is optimal for an ordered product and a technique for presenting the order closing time are applicable at the same time. However, the present invention is not limited to this, and any online shopping system can be employed so long as either one of such techniques are applied to the online shopping system.

Further, the present embodiment has been described with respect to the case where a delivery container having the smallest size among delivery containers that are capable of receiving (containing) the total volume of the product is determined as the delivery container which is optimal for delivering ordered products. However, the price of the delivery container decreases as the frequency at which the delivery container is used increases, and therefore, in some cases, the price of the delivery container having a smaller size is not always lower. In such a case, the delivery container at the lowest cost among delivery containers that are capable of receiving the total volume of the product may be determined as the delivery container which is optimal for delivering ordered products, thereby reducing the total cost. Moreover, in the case where the price of delivery container and shipping fees are set separately, the delivery container may be determined such that the sum of the price of the delivery container and the shipping fees is minimum.

While the invention has been described in detail, the foregoing description is in all aspects illustrative and not restrictive. It is understood that numerous other modifications and variations can be devised without departing from the scope of the invention.

What is claimed is:

1. An information processing apparatus for performing a process required for delivering at least one product to a user, the at least one product being ordered by the user via a terminal apparatus connected to a network, with the at least one product being stored in any one of a plurality of types of prestandardized delivery containers, said information processing apparatus comprising:

an information storing section for storing product information related to a plurality of types of products, the product information including at least information about product volumes, and delivery container information related to the plurality of types of prestandardized delivery containers, the delivery container information including at least information about internal capacities and prices of the delivery containers;

a receiving section for receiving information related to a product order from the terminal apparatus;

a first processing section for automatically selecting a delivery container capable of storing all ordered products based on the product information and the delivery container information each time said receiving section receives a product order;

a second processing section for obtaining, based on the delivery container information, information related to a price difference between a new delivery container selected anew by said first processing section and an old delivery container previously selected by said first processing section; and a transmitting section for transmitting, to the terminal apparatus, the information related to the price difference obtained by said second processing section.

2. The information processing apparatus according to claim 1, wherein said transmitting section is operable to transmit, to the terminal apparatus, a balance between prices of the new delivery container and the old delivery container as the information related to the price difference.

3. The information processing apparatus according to claim 1, wherein said transmitting section is operable to transmit, to the terminal apparatus, both the prices of the new delivery container and the old delivery container as the information related to the price difference.

4. The information processing apparatus according to claim 1, wherein when there is a price difference between the new delivery container and the old delivery container, said transmitting section is operable to transmit, to the terminal apparatus, an instruction to display a specific symbol, which represents an existence of the price difference, on a screen as the information related to the price difference.

5. The information processing apparatus according to claim 1, wherein:
the delivery container information stored in said information storing section further includes a prescribed mark indicating a delivery container type; and
said transmitting section is operable to transmit, to the terminal apparatus, an instruction to display a symbol representing the new delivery container and a symbol representing the old delivery container on the screen as the information related to the price difference.

6. The information processing apparatus according to claim 1, wherein said first processing section is operable to select, as an optimal delivery container, a delivery container having the smallest internal capacity from among the delivery containers capable of storing the at least one ordered product.

7. The information processing apparatus according to claim 1, wherein said first processing section is operable to select, as the optimal delivery container, a delivery container having the lowest price from among the delivery containers capable of storing the at least one ordered product.

8. The information processing apparatus according to claim 1, wherein the delivery containers are standardized so as to be in a relationship that each of a width, a depth, and a height of one type of delivery container are a multiple or a submultiple of a corresponding dimension of other types of delivery containers.

9. The information processing apparatus according to claim 1, wherein:
said information storing section further includes user information including at least information about a delivery source location responsible for delivery to the user, and delivery network information including at least information about a closing time for loading at the delivery source location;
said second processing section is further operable to obtain information about an order closing time, which allows the product to be delivered to the user in a minimum amount of time, based on the user information and the delivery network information; and
said transmitting section is further operable to transmit, to the terminal apparatus, the information about the order closing time obtained by said second processing section.

10. The information processing apparatus according to claim 9, wherein said transmitting section operable to transmit, to the terminal apparatus, information about a remaining time from the current time to the order closing time.

11. The information processing apparatus according to claim 1, wherein:
said information storing section is further operable to store specific information related to the delivery source location; and
said transmitting section is operable to transmit the specific information to the terminal apparatus on demand from the user.

12. The information processing apparatus according to claim 9, wherein:
said information storing section is further operable to store specific information related to the delivery source location; and
said transmitting section is operable to transmit the specific information to the terminal apparatus on demand from the user.

13. The information processing apparatus according to claim 11, wherein the specific information includes at least one of an address, a telephone number, business hours and an owner's name of the delivery source location, and a product directly sold by the delivery source location.

14. The information processing apparatus according to claim 12, wherein the specific information includes at least one of an address, a telephone number, business hours and an owner's name of the delivery source location, and a product directly sold by the delivery source location.

15. An online shopping system in which an information processing apparatus owned by a seller is connected to a terminal apparatus available to a user via a network and at least one product which is ordered by a user via said terminal apparatus is delivered to the user, the at least one product being stored in any one of a plurality of types of prestandardized delivery containers which is selected by said information processing apparatus,
wherein said terminal apparatus comprises:
an input section capable of inputting information required for ordering the at least one product;
a communication section for transmitting to/receiving from said information processing apparatus information related to a product order; and
a display section for displaying the information related to the product order; and
wherein said information processing apparatus comprises:
an information storing section for storing product information related to a plurality of types of products, the product information including at least information about product volumes, and delivery container information related to the plurality of types of prestandardized delivery containers, the delivery container information including at least information about internal capacities and prices of the delivery containers;
a receiving section for receiving information related to the product order from said terminal apparatus;
a first processing section for automatically selecting a delivery container capable of storing all ordered products based on the product information and the delivery container information each time said receiving section receives a product order;
a second processing section for obtaining, based on the delivery container information, information related to a price difference between a new delivery container selected anew by said first processing section and an old delivery container previously selected by said first processing section; and
a transmitting section for transmitting, to the terminal apparatus, the information related to the price difference obtained by said second processing section so as to display the information on said display section.

16. An information processing method performed in an online shopping system in which at least one product which is ordered by a user via a network is delivered to the user, the at least one product being stored in any one of a plurality of types of prestandardized delivery containers, said method comprising:

receiving a product order from the user;

automatically selecting a delivery container capable of storing the ordered product from among the plurality of types of prestandardized delivery containers based on a volume of the product and an internal capacity of the delivery container, and obtaining a price of the delivery container;

reselecting a new delivery container capable of storing all ordered products including an additionally ordered product each time an additional product is ordered, and obtaining a price of the new delivery container;

obtaining information related to a price difference between the new delivery container selected in accordance with the additional order and a previously selected old delivery container; and presenting the obtained information related to the price difference to the user.

17. A recording medium having an information processing method stored therein as a program which can be executed by a computer, the method being performed in an online shopping system in which at least one product which is ordered by a user via a network is delivered to the user, the at least one product being stored in any one of a plurality of types of prestandardized delivery containers, said program causing the computer to execute operations comprising:

receiving a product order from the user;

automatically selecting a delivery container capable of storing the at least one ordered product from among the plurality of types of prestandardized delivery containers based on a volume of the at least one product and an internal capacity of the delivery container, and obtaining a price of the delivery container;

reselecting a new delivery container capable of storing all ordered products including an additionally ordered product each time an additional product is ordered, and obtaining a price of the new delivery container;

obtaining information related to a price difference between the new delivery container selected in accordance with the additional order and a previously selected old delivery container; and presenting the obtained information related to the price difference to the user.

* * * * *